Sept. 22, 1936.  J. W. GRANT  2,055,076
HOSE NOZZLE
Filed June 2, 1936  2 Sheets-Sheet 1

Inventor
J. W. Grant

By Cashrow & Co.
Attorneys.

Sept. 22, 1936.   J. W. GRANT   2,055,076
HOSE NOZZLE
Filed June 2, 1936   2 Sheets-Sheet 2

Inventor
J. W. Grant
By C. A. Snow & Co.
Attorneys.

Patented Sept. 22, 1936

2,055,076

UNITED STATES PATENT OFFICE 2,055,076

HOSE NOZZLE

Jordan W. Grant, Portsmouth, Va.

Application June 2, 1936, Serial No. 83,140

8 Claims. (Cl. 299—152)

The device forming the subject matter of this application is a hose nozzle. The invention aims to provide a straightaway nozzle in which there will be no distortion of the flow, friction being cut down accordingly. Another object of the invention is to provide novel means whereby a disk through which the liquid flows may be renewed at will. A further object of the invention is to provide novel means for securing a strong clamping action on the disk, leakage being prevented but the construction being such that, in the event of abnormal pressure, relative longitudinal movement may take place between the outlet member and the casing of the nozzle, thereby relieving abnormal pressure. A further object of the invention is to supply a device of the class described which will be substantially self-cleaning. Another object of the invention is to supply a nozzle in which high working pressures are possible without leakage or undue wear. The invention aims, further, to improve and to enhance the utility of devices of that type to which it appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
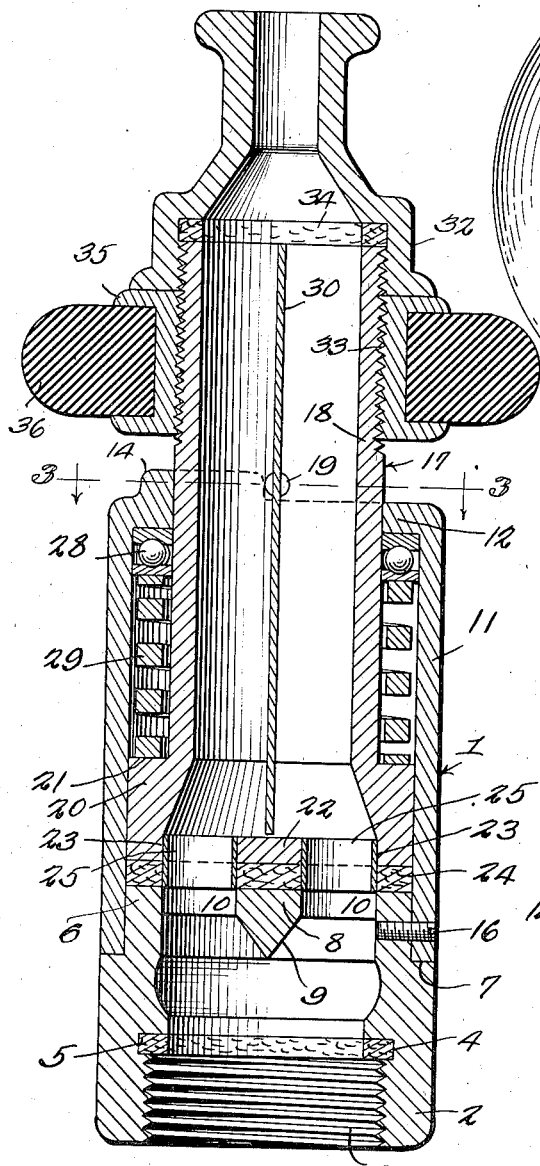
Fig. 1 shows, in longitudinal section, a hose nozzle constructed in accordance with the invention.
Figure 2:
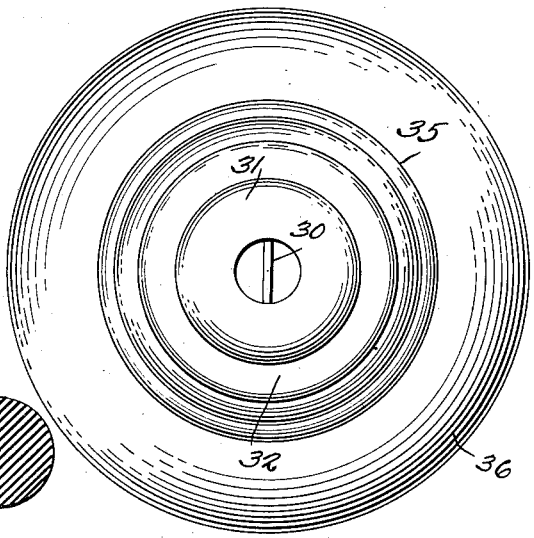
Fig. 2 is an end elevation.
Figure 3:
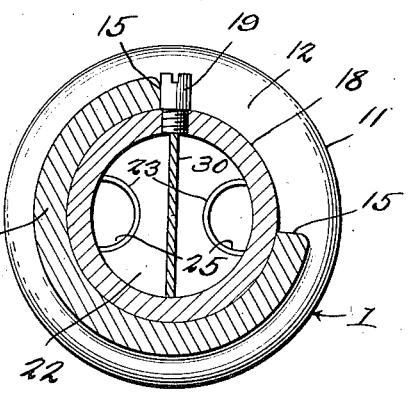
Fig. 3 is a transverse section on the line 3—3 of Fig. 1.
Figure 4:
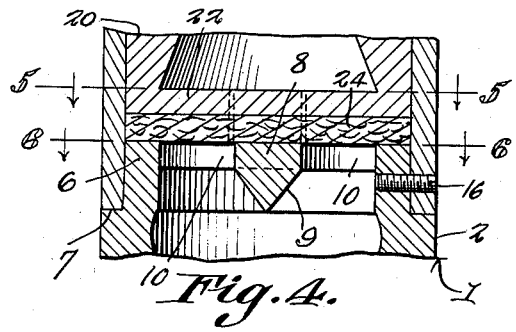
Fig. 4 is a fragmental longitudinal section wherein the cutting plane is disposed at right angles to the cutting plane in Fig. 1.
Figure 5:
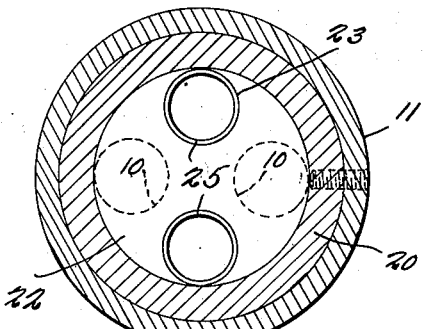
Fig. 5 is a transverse section on the line 5—5 of Fig. 4.
Figure 6:
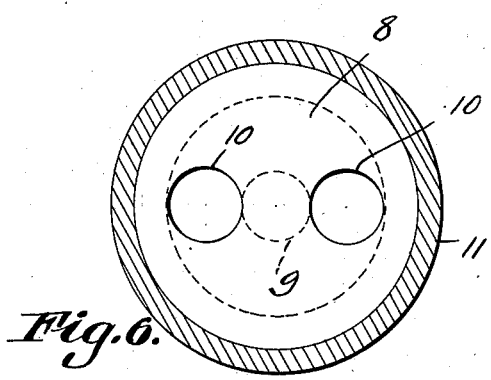
Fig. 6 is a transverse section on the line 6—6 of Fig. 4.

Referring to Figs. 1 to 6, there is shown a two-part casing, which, in Fig. 1, is denoted generally by the numeral 1. The casing 1 comprises a butt 2. At one end, the butt 2 has an internally threaded portion 3 enabling the device to be connected to a hose (not shown). Adjacent to the threaded portion 3, the butt 2 has an internal recess 4, receiving a compressible washer 5. The butt 2 has a reduced neck 6 forming a transverse, external, circumferential shoulder 7. The end wall 8 of the neck 6 of the butt 2 may be referred to as an internal transverse partition in the casing 1, and is formed integrally with the neck. The end wall or partition 8 carries a central pointed spreader stud 9, projecting toward the inlet end of the butt 2, as shown in Fig. 1. Ports 10 are formed in the partition 8 of the butt 2. These ports 10, in Fig. 6, are shown as disposed on opposite sides of the stud or spreader 9. But two of the ports 10 are delineated, but it will be understood that there may be as many or as few of said ports as may be desired.

The casing 1 comprises a tubular body 11. At its outer end, the tubular body 11 has an inwardly-projecting circular flange 12. The flange 12 is supplied with a parti-circumferential, external rib 14 (Figs. 1 and 3), the ends of the rib constituting stops 15. The inner end of the tubular body 11 is disposed about the neck 6 of the butt 2, as shown in Fig. 1, and is connected thereto by a securing device 16, such as a screw.

An outlet member 17 is provided, and is a composite structure. The outlet member 17 comprises a tube 18 journaled in the flange 12 of the body 11 of the casing. The tube 18 carries a stud or screw 19 (Fig. 3), the stud constituting a stop, adapted to engage the shoulders 15, the interengageable parts 15 and 19 coacting to limit the rotation of the tube 18 in a way which will be evident from Fig. 3.

The tube 18 has an enlarged foot 20, received rotatably within the body 11 of the casing 1. The foot 20 forms an external circumferential shoulder 21 on the tube 18. The foot 20 has an integral end wall 22, which may be denominated an internal partition in the outlet member 17. The partition 22 is provided with ports 23. The ports 23 are adapted to register with the ports 10 in the partition 8 of the butt 2 of the casing 1.

A renewable disk 24 fits within the tube 18, between the partition 8 of the butt 2 and the partition 22 of the tube 18. The disk 24 has openings, in which are fixed tubular metal connections 25, received detachably in the ports 23 of the partition 22 of the tube 18. Thus, the disk 24 is connected to the partition 22 for rotation when the tube 18 is rotated. The disk 24 may be made of fibre or similar material, which is subject to wear. The tubular connections or thimbles 25, however, prevent wear, as the water or other liquid passes through them.

Figure 7:
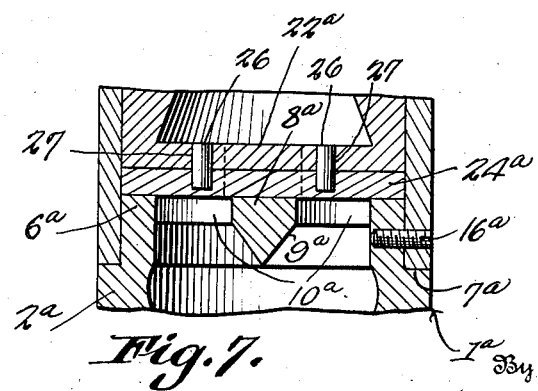
Fig. 7 is a fragmental longitudinal section, showing a modification in the means for mounting the renewable disk.

It is not necessary that the tubular connections 25 be employed. In Fig. 7, parts hereinbefore described have been designated by numerals previously used, with the suffix "a". In this form of the invention, the disk 24a may be made of metal or the like, and under such circumstances, the disk carries dowel pins 26, engaged in openings 27 formed in the end wall 22a of the tubular member 18a.

Reverting to Fig. 1, a ball bearing 28 is disposed about the tube 18, within the body 11. The ball bearing 28 abuts against the flange 12 on the body 11. A compression spring 29 surrounds a portion of the tube 18 and is disposed within the tubular body 11 of the casing 1. One end of the compression spring 29 abuts against the ball bearing 28, and the opposite end of the compression spring abuts against the shoulder 21 on the foot 20 of the tube 18. A divider 30 is disposed within the tube 18, and is secured thereto. The divider 30 is in the form of a plate, shown as extending from the outer end of the tube 18 to a point closely adjacent to the partition 22 of the tube. The divider 30, however, may be spaced from the partition 22 of the tube 18 to any desired extent.

A spout 31 is provided, and has an enlarged portion 32, engaged with threads 33 on the tube 18. A washer 34 is compacted against the end of the tube 18 by the spout 31. A channel ring 35 is engaged with the threads 33 of the tube 18 and serves as a lock nut which prevents the spout 31 from threading off the tube 18. The channel ring 35 carries a grip ring 36, which may be made of rubber or other suitable material, the ring 36 constituting means whereby an operator may rotate the tube 18.

In practical operation, the tube 18 is rotated by means of the ring 36, and the renewable disk 24 is rotated also, owing to the presence of the tubular connections 25, until the said connections register with the ports 10 in the end wall 8 of the butt 2. Then water or other liquid can flow through the nozzle. The liquid is directed toward the ports 10 by the stud 9. Having passed through the ports 10 and the tubular connections 25, the liquid flows through the tube 18, on each side of the divider 30, the divider 30 serving to prevent a whirling motion, as the liquid leaves by way of the spout 31. When the tubular connections 25 are aligned with the ports 10, the stop 19 on the tube 18 is in engagement with one of the shoulders 15 of the body 11, and when the tubular connections 25 are not in registration with the ports 10, the stop 19 is in engagement with the other of the shoulders 15, all of which will be understood readily when Fig. 3 of the drawings is noted.

The function of the spring 29 is to bind the renewable disk 24 tightly between the partition 8 of the butt 2 and the partition 22 of the tube 18. The spring 29, however, has another function, in that, when the ports 10 are closed, if there is an abnormal pressure behind the partition 22 of the tube 18, the tube can move forwardly a little, thereby spacing the parts 24 and 10, pressure thereby being relieved. The ball bearing 28 facilitates the rotation of the tube 18 with respect to the casing 1.

Figure 8:
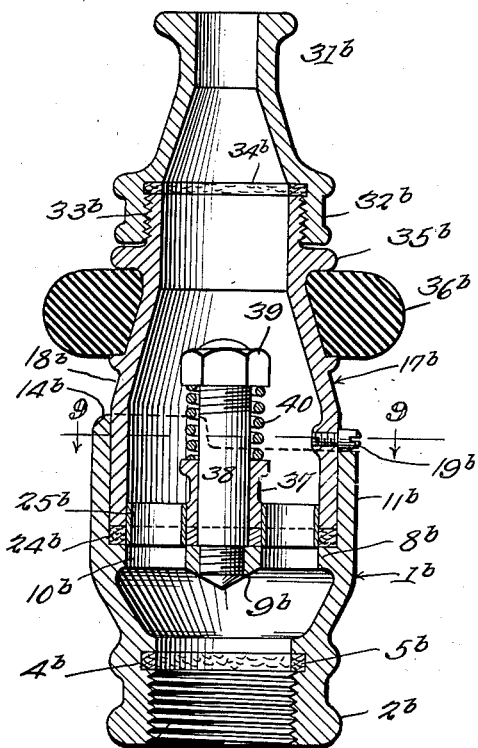
Fig. 8 is a longitudinal section showing a modified form of the nozzle forming the subject matter of this application.

In Fig. 8, parts hereinbefore described have been designated by numerals already used, with the suffix "b".

The body 11b and the butt 2b of the casing 1b are formed in one piece. The channel ring 35b is formed integrally with the tube 18b.

The partition 22b of the tube 18b carries a guide neck 37 in which reciprocates a post 38, threaded at its inner end into the central portion of the partition 8b, the end of the post constituting the point of the stud or spreader 9b. An abutment nut 39 is threaded on one end of the post 38. A compression spring 40 surrounds a portion of the post 38. One end of the compression spring 40 abuts against the guide neck 37, and the opposite end of the spring abuts against the nut 39 on the post 38.

Figure 9:
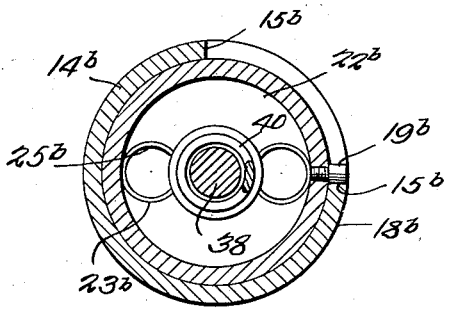
Fig. 9 is a cross section on the line 9—9 of Fig. 8.

The operation of the device shown in Figs. 8 and 9 does not differ in many respects from the operation of the device shown in Fig. 1. The spring 40 can yield, like the spring 29, and for the same purpose, and constitutes means for holding the ported parts 22b and 8b in binding relation to the disk 24b, the spring 40 being internal with respect to the tubular member 18b, instead of external thereto, as shown in connection with the spring 29 and the member 18 of Fig. 1.

Having thus described the invention, what is claimed is:

1. A nozzle comprising a casing and an outlet member, each having a transverse internal partition, each partition having a port, the nozzle being rotatable to bring the ports into and out of registration, a renewable disk between the partitions and having an opening that registers with the ports, means for connecting the disk to the outlet member for rotation therewith, the outlet member being movable longitudinally of the casing in one direction, under abnormal pressure, to space the disk from the partition of the casing and afford relief through the ports and the opening, and spring means cooperating with a part of the outlet member and with a part of the casing, to move the nozzle longitudinally in an opposite direction and press the disk against the partition of the casing, the spring means being yieldable under abnormal pressure, to permit the nozzle to move longitudinally in the first-specified direction and to space the disk from the partition of the casing, as aforesaid.

2. A device of the class described, constructed as set forth in claim 1, in combination with interengageable parts on the outlet member and on the casing, coacting to limit the rotation of the outlet member with respect to the casing.

3. A device of the class described, constructed as set forth in claim 1, and further characterized by the fact that the means for connecting the disk to the outlet member for rotation therewith embodies a tubular thimble joining the disk with the partition of the outlet member and opening through the disk and said partition.

4. A device of the class described, constructed as set forth in claim 1, and wherein the means for connecting the disk to the outlet member for rotation therewith comprises a detachable dowel pin connection between the disk and said partition.

5. A device of the class described, constructed as set forth in claim 1, and wherein the partition of the casing is provided with a centrally disposed spreading stud projecting toward the intake end of the casing.

6. A device of the class described, constructed as set forth in claim 1, in combination with a divider mounted in the outlet member and extended longitudinally thereof, the divider being disposed between the partition of the outlet member and the outlet end of the outlet member.

7. A device of the class described, constructed as set forth in claim 1, and wherein the casing has an internal shoulder, the outlet member being provided with an external shoulder, the spring means being disposed between the outlet member and the casing, and exerting pressure in opposite directions against the shoulders.

8. A device of the class described, constructed as set forth in claim 1, and wherein the partition of the casing is provided with a post wherein the partition of the outlet member can slide, an abutment on the post, and a compression spring about a portion of the post and engaging the abutment and a part of the partition of the outlet member.

JORDAN W. GRANT.